Aug. 23, 1932.   J. WOOD   1,872,863
PIPE COUPLING
Filed July 1, 1930

INVENTOR.
Joseph Wood.
BY
ATTORNEY.

Patented Aug. 23, 1932

1,872,863

UNITED STATES PATENT OFFICE

JOSEPH WOOD, OF DETROIT, MICHIGAN, ASSIGNOR TO BARCY-NICHOLSON COMPANY, OF DETROIT, MICHIGAN, A CORPORATION OF MICHIGAN

PIPE COUPLING

Application filed July 1, 1930. Serial No. 465,139.

This invention relates to couplings and more particularly to means for sealing and coupling the end of a gasoline line or tube to a carburetor wall.

An object of this invention is a coupling which is much more economical of manufacture than couplings heretofore manufactured, but which at the same time lacks none of the beneficial characteristics of such couplings.

A further object is a coupling adapted to clamp a bulged portion of the gasoline line or tube against the wall of the carburetor, in order to seal it securely and to hold the gasoline line in place.

A still further object is a coupling of the character described above, wherein the bulged portion is integral with the gasoline line or tube.

A still further object is a novel process of manufacturing couplings of the character described above.

Still further objects will readily occur to those skilled in the art upon reference to the following description and the accompanying drawing in which Fig. 1 shows a portion of gasoline line having a coupling member thereon.

Figure 1:
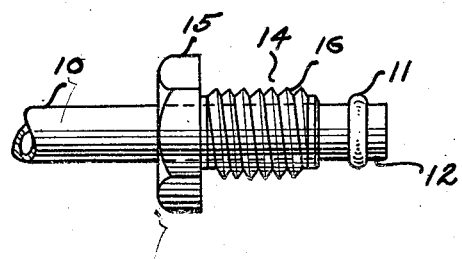

As indicated in the drawing, the gasoline line 10, which is generally made of soft brass tubing about ¼ inch in diameter, is provided with a bulged portion 11 integral therewith and adjacent the end 12. Mounted upon the tube 10 is a hollow coupling member 11 having a nut portion at 15 and an external thread at 16, the member 14 being provided with a bore 17 throughout its length and of a size to loosely receive pipe or tube 10.

It will be observed that the bulged portion 11 aids in preventing removal of the member 14 from the gasoline line so that when the gasoline line is removed from the carburetor, the member 14 will not be separated from the tube and therefore will not be lost.

The construction thus far described may be and preferably is made by the following process. The member 14 is slipped onto the tube 10 and pushed back from the end 12, whereupon the end 12 is inserted in a machine which expands the tube or deforms the metal thereof to provide a bulge 11 between the end 12 and the member 14.

Figure 2:
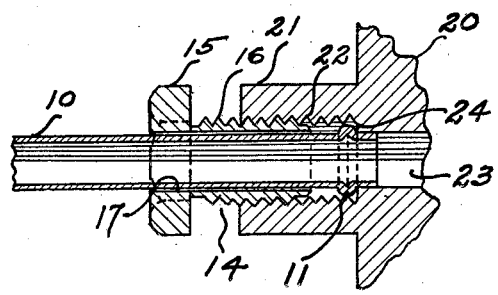
Fig. 2 shows in section, a partially completed coupling.

The carburetor or other element to which connection is to be made is illustrated at 20, and as shown in Fig. 2, is provided with a portion 21 which is internally threaded at 22 and internally bored at 23, the bore being slightly smaller in diameter than the thread so as to form a shoulder 24 for purposes to be described.

The coupling of the tube 10 to the carburetor 20 is readily and simply made. The member 14 is slipped back upon the tube 10 and the end 12 of the tube is inserted in the bore 23 of the carburetor with the bulged portion 11 abutting the shoulder 24. The member 14 is then moved towards the carburetor and threaded therein, the nut portion serving to facilitate such threading, the end of the member 14 then serving to clamp and seal the bulge 11 against the shoulder or wall 24.

Figure 3:
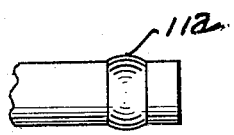
Fig. 3 shows a modification of a gasoline line or tube.

A modification of the tube, illustrated in Fig. 3, differs from the form of Figs. 1 and 2 in that the bulged portion 11a is substantially greater in longitudinal dimension than the bulged portion 11, its coaction with the wall 24 and the end of the member 14 resembling the coaction between the bulged portion 11 and the parts 14 and 24.

It will be observed that the bulged portion serves to effectually seal the tube 10 to the element 20 when the coupling is completed, serving as a gasket as well as a clamped portion. Further, by virtue of the element 11 being integral with the tube 10, the use of a separate gasket or clamping member is eliminated, thus reducing the cost to a considerable extent.

Now having described the invention and the preferred embodiment thereof, it is to be understood that the said invention is to be limited, not to the specific details herein set forth and illustrated, but only by the scope of the claim which follows.

I claim:—

In a carburetor and gasoline line coupling, an element having a bore and an internal thread of larger diameter concentric therewith, a member having a similar bore and an external thread concentric therewith adapted to mate with the element thread, and a tube in said bores having an elongated, resilient, soft metal bulged portion integral therewith and adapted to be clamped and compressed between the end of said member and a wall of said element the bulge being long enough in proportion to its diameter, to prevent complete collapse of the bulge, when the member and elements are threaded together as far as possible.

JOSEPH WOOD.